(12) United States Patent
Bazzoni et al.

(10) Patent No.: US 6,736,463 B2
(45) Date of Patent: May 18, 2004

(54) WHEEL FOR A MOTOR VEHICLE

(75) Inventors: Davide Bazzoni, Milan (IT); Lorenzo Bessone, Turin (IT); Andrea Finzi, Triuggio (IT)

(73) Assignee: Gianetti Route S.p.A., Turin (IT)

( * ) Notice: Subject to any disclaimer, the term of this patent is extended or adjusted under 35 U.S.C. 154(b) by 0 days.

(21) Appl. No.: 10/181,723

(22) PCT Filed: Jan. 18, 2001

(86) PCT No.: PCT/IB01/00046

§ 371 (c)(1),
(2), (4) Date: Nov. 8, 2002

(87) PCT Pub. No.: WO01/53117

PCT Pub. Date: Jul. 26, 2001

(65) Prior Publication Data

US 2003/0122415 A1 Jul. 3, 2003

(30) Foreign Application Priority Data

Jan. 20, 2000 (IT) ..................................... TO2000A0052

(51) Int. Cl.$^7$ ............................... B60B 3/00; B60B 5/02
(52) U.S. Cl. ............................. 301/64.306; 301/64.702; 301/64.703
(58) Field of Search .................. 301/64.203, 64.302, 301/64.303, 64.306, 64.702, 64.703, 64.705, 95.101, 95.102, 95.106, 95.107, 95.108

(56) References Cited

U.S. PATENT DOCUMENTS

| | | | |
|---|---|---|---|
| 1,624,771 A | * | 4/1927 | Turner et al. .......... 301/95.102 |
| 2,028,536 A | | 1/1936 | Eskergian |
| 3,968,996 A | * | 7/1976 | Wilcox ..................... 301/37.43 |
| 4,000,926 A | * | 1/1977 | Wlcox .................... 301/64.306 |
| 4,017,348 A | * | 4/1977 | Shumaker .............. 301/64.702 |
| 4,035,028 A | * | 7/1977 | Wilcox ................... 301/64.702 |
| 4,200,326 A | * | 4/1980 | Wilcox ................... 301/64.306 |
| 4,252,378 A | | 2/1981 | DeBolt |
| 4,471,999 A | | 9/1984 | Browne |
| 4,919,490 A | * | 4/1990 | Hopkins et al. ........ 301/64.702 |
| 4,983,430 A | * | 1/1991 | Sargent ................. 301/64.703 |
| 5,073,315 A | * | 12/1991 | Bertelson ............... 301/64.703 |

FOREIGN PATENT DOCUMENTS

EP        0 539 214 A        4/1993

* cited by examiner

Primary Examiner—S. Joseph Morano
Assistant Examiner—Jason R. Bellinger
(74) Attorney, Agent, or Firm—Sughrue Mion, PLLC

(57) ABSTRACT

The wheel includes an outer rim, made of a metal material, for supporting a tire, first and second annular elements, also metal, are each arranged within the rim with a circumferential skirt adjacent the rim and a perimretal edge connected to a corresponding outer edge of the rim, with an inner annular flange lying in a plane substantially orthogonal to the axis of the wheel and facing and fixed to a corresponding flange on the other annular element so as to form an annular assembly for fixing to a wheel hub; and stiffening means provided in the region defined between the rim and the circumferential skirts of said annular elements.

8 Claims, 2 Drawing Sheets

WHEEL FOR A MOTOR VEHICLE

This is a National stage entry under 35 U.S.C. §371 of Application No. PCT/IB01/00046 filed Jan. 18, 2001; the disclosure of which is incorporated herein by reference.

BACKGROUND OF THE INVENTION

The present invention relates to a wheel for motor vehicles in general.

More specifically, the object of the invention is a wheel for a motor vehicle which includes a metal outer rim for supporting a tire.

The motor vehicle wheel of the invention is characterised in that it also includes first and second annular elements, also both made of metal and each arranged within the rim and having a circumferential skirt adjacent the rim, with an edge connected to a corresponding edge of the rim, and an inner annular flange lying in a plane substantially orthogonal to the axis of the wheel and facing and fixed to a corresponding flange on the other annular element so an to form an annular assembly for fixing to a wheel hub, and stiffening means provided in the region between the rim and the circumferential claddings of the said annular elements.

According to a further characteristic, a metal spacer ring is positioned between the flanges of the said annular elements.

SUMMARY OF THE INVENTION

According to a first aspect of the invention, the aforesaid stiffening means include a heat resistant plastics material, a high-density polyurethane resin for example, injected into this region.

As well as, or as an alternative to, this plastics material, the stiffening means may also includes at least a pair of shaped metal rings, interposed between the rim and the circumferential claddings of the said annular elements.

BRIEF DESCRIPTION OF THE DRAWINGS

Further characteristics and advantages of the invention will become apparent from the detailed description which follows, provided purely by way of non-limitative example, with reference to the appended drawings, in which.

DETAILED DESCRIPTION OF THE INVENTION

Figure 1:
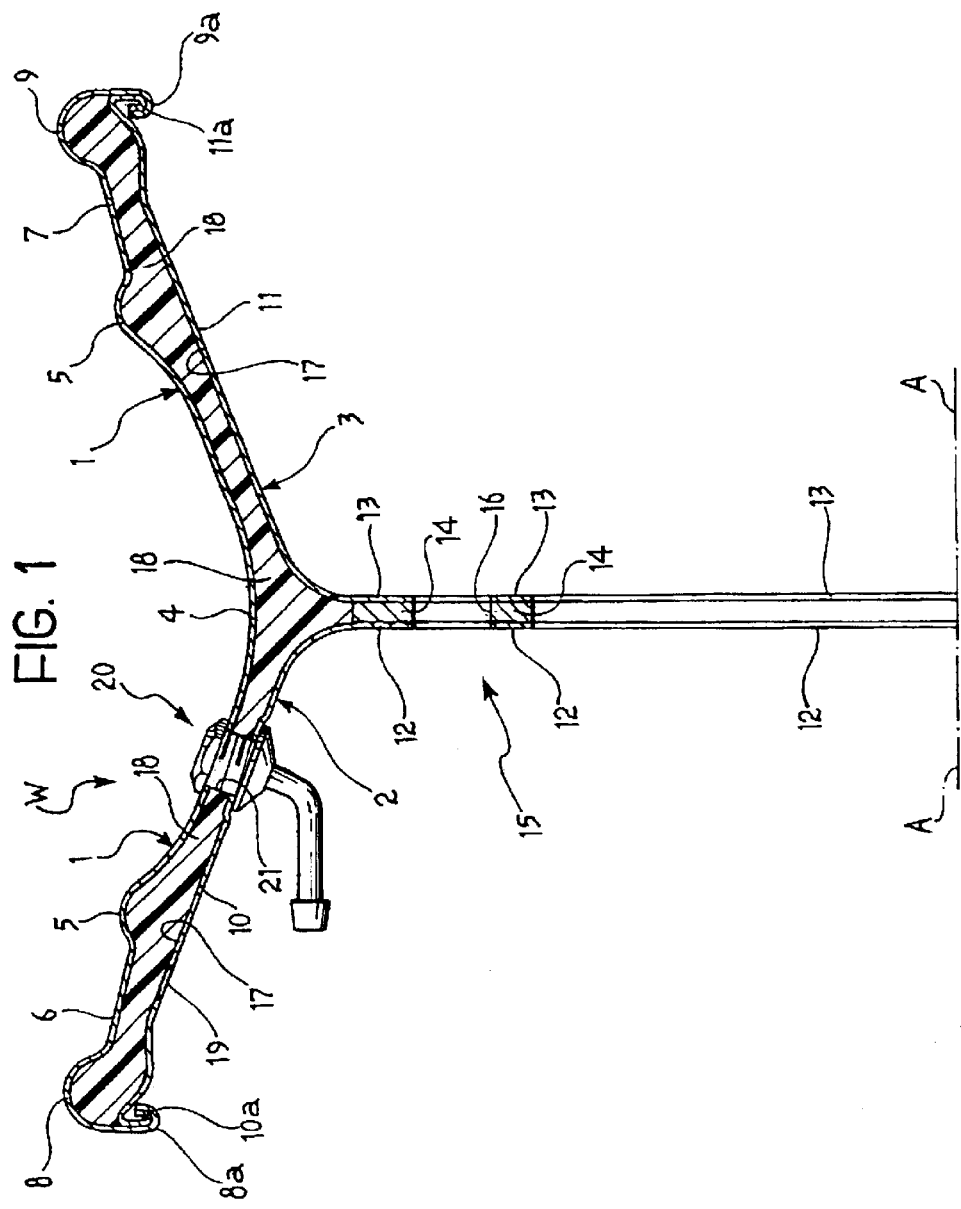
FIG. 1 is an axially sectioned partial view of a motor vehicle wheel of the invention.

A wheel according to the invention is generally indicated W in FIG. 1.

This wheel includes a metal outer rim 1. Using methods known in the art, this wheel is made from a sheet of metal, in particular steel, bent into a ring. The ends of the sheet are welded together and the ring thus constructed is formed into the desired shape by forming and rolling operations.

In the embodiment shown by way of example, the wheel W is a wheel for a commercial vehicle and the rim 1 has a central portion 4 which is depressed, forming a channel between two circumferential humps 5. The humps 5 separate the channel portion 4 from two shoulder portions 6 and 7, an outer and an inner shoulder respectively, which are provided to receive the beads of a tire (not illustrated).

The shoulder portions 6 and 7 are connected to curved edge portions 8 and 9 of the rim, which are outwardly convex.

The shape of the rim shown in the drawings is not limitative however.

The wheel W also comprises two annular elements 2 and 3, also both made of metal, arranged within the rim 1. These annular elements 2 and 3 are made by cutting and drawing, for example, and each have a circumferential skirt 10, 11 adjacent the rim 1 and having a perimeter edge 10, 11a joined, by a folded seam for example, to a corresponding outer edge 8a, 9a of the rim 1.

Alternatively, the edges 10a, 11a of the annular elements 2 and 3 could be fixed to the edges 8a and 9a of the rim 1 by welding, TIG welding for example.

The annular elements 2 and 3 also each have an inner flange 12, 13 lying in a plane substantially orthogonal to the axis A—A of the wheel W and each facing and fixed to a corresponding flange 13, 12 of the other annular element. A metal spacer ring 14, made of steel for example, is preferably interposed between the flanges 12 and 13 of the annular elements 2 and 3.

Conveniently, the flanges 12 and 13 of the annular elements 2 and 3 are fixed to each other and to the spacer ring 14 by welding, projection welding for example.

The flanges 12, 13 and the spacer ring 14 form together an annular assembly 15 for fixing to a wheel hub (not illustrated). To this end, it is convenient for the assembly 15 to have openings or through-holes 16 for fixing means such as bolts or the like.

In the structure as described, a region 17 is defined between the rim 1 and the circumferential skirts 10 and 11 of the annular elements 2 and 3.

In order to stiffen the structure of the wheel W, a heat resistant plastics material 18, such as a low-expansion or high density polyurethane resin, can be injected into the region 17. This plastics material can be injected through one or more of the holes formed in at least one of the annular elements 2 or 3, such as the opening indicated 19 in FIG. 1.

A valve 20 for inflating the tire can be fitted into a passage 21 formed through the outer portion of the rim 1 and also through the skirt 10 of the annular element 2, as well as through the stiffening plastics material 18, as shown in FIG. 1.

Figure 2:
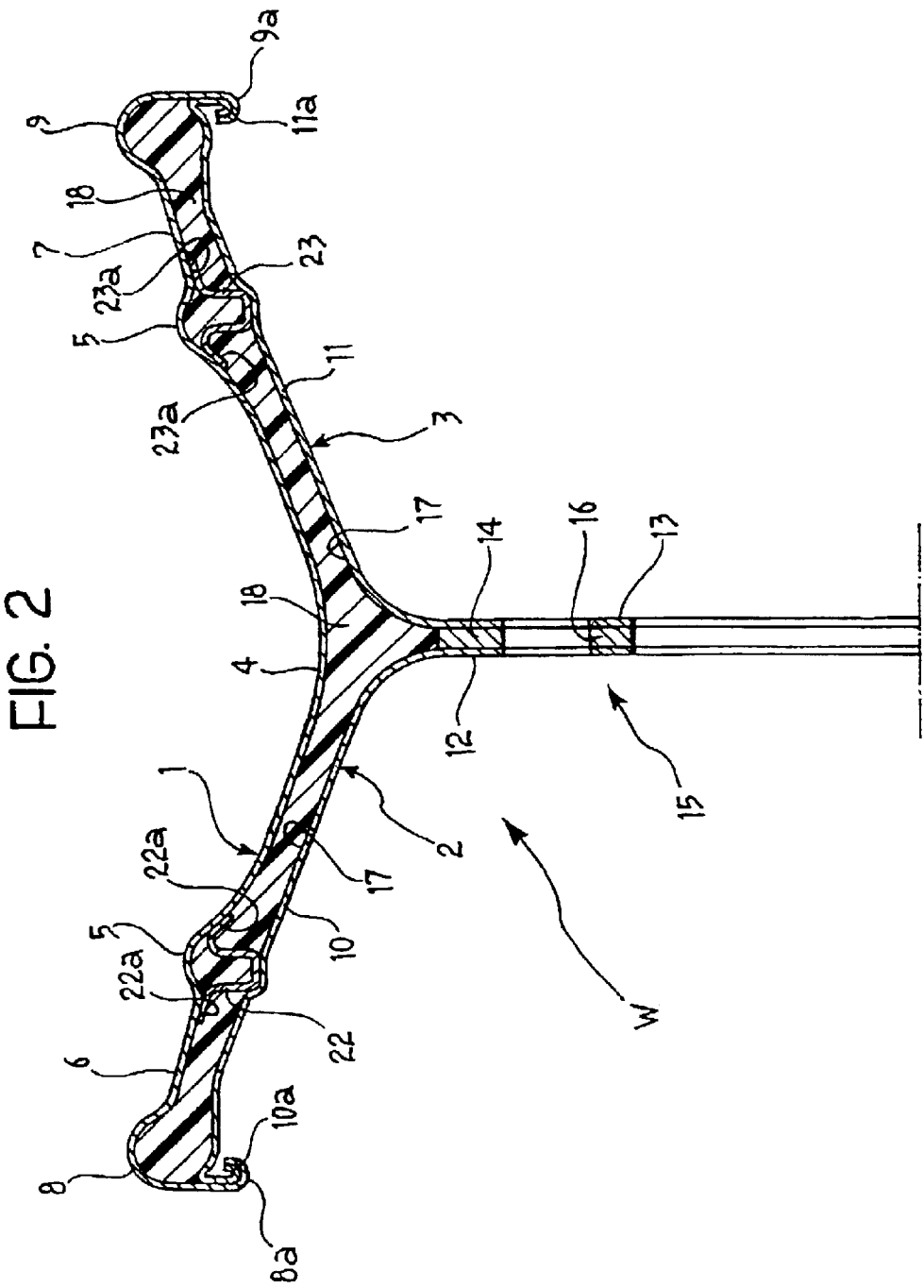
FIG. 2 is an axially sectioned partial view of a variant of the invention.

FIG. 2 illustrates a variant of the wheel according to the invention.

In this drawing, parts and elements which have already been described have been given the same reference letters or numbers.

In the variant of FIG. 2, two metal rings 22 and 23 are provided in the region 17 defined between the rim 1 and the annular elements 2 and 3 as additional means for stiffening the structure of the wheel. In the embodiment illustrated, the metal rings 22 and 23 form a channel in cross section, with the concavity facing the rim 1, and are arranged at the humps 5 in the region 17. The upper edges 22a, 23a respectively of these rings are folded over in contact with the inner surface of the rim 1 and, more conveniently, are welded thereto. The bottom surface of the channel-like portion of the stiffening rings 22 and 23 are each welded to a corresponding portion of the skirts 10 and 11 of the annular elements 2 and 3.

In a further variant, which is not illustrated, a wheel according to the invention may be constructed as in FIG. 2 but without the plastics material 18 in the region 17. In this case, only the stiffening rings 22 and 23 reinforce the wheel structure.

The motor vehicle wheel of the invention can easily be constructed in such a way that it weighs the same as an equivalent conventional wheel made of a light metal alloy such as an aluminium alloy and significantly less than a conventional pressed steel wheel.

On the other hand, the manufacturing cost of the wheel of the invention is similar to that of a conventional pressed steel wheel and significantly less than that of a light alloy wheel. These characteristics make the wheel of the invention particularly advantageous.

Naturally, the principle of the invention remaining unchanged, embodiments and manufacturing details may vary widely from those described and illustrated purely by way of non-limitative example, without departing thereby from the scope of the invention as claimed in the appended claims.

What is claimed is:

1. A wheel for a motor vehicle including a rim structure of metal material for supporting a tire, and a disc structure, also of metal material, inseparably connected with the rim structure and adapted to be detachably connected to a wheel hub;

said rim structure including an outer rim member made of metal material; circumferential humps being formed in edge portions of said outer rim member;

said disc structure including first and second annular elements, also of metal material, each said annular element being arranged within said outer rim member and having a circumferential skirt adjacent the outer rim member with a perimeter edge of said skirt connected to a corresponding edge of said outer rim member; each annular element having further an annular inner flange lying in a plane substantially orthogonal to an axis of the wheel, the inner flange of one annular element being connected to the corresponding inner flange of the outer annular element so as to form an annular disc portion adapted to be detachably connected to a wheel hub;

said outer rim member and the skirts of said annular element defining a region wherein there are arranged stiffening means including a heat resistant plastics material injected into the aforesaid region, and a pair of metal rings interposed between the outer rim member and the circumferential skirts of the said annular elements at the site of the said humps.

2. A wheel according to claim 1, in which a spacer ring (14) made of a metal material is interposed between the flanges (12, 13) of said annular elements (2, 3).

3. A wheel according to claim 1, in which said plastics material is a high-density polyurethane resin.

4. A wheel according to claim 1, in which the said stiffening rings (22, 23) form a channel in cross section facing the outer rim member (1).

5. A wheel according to claim 1, in which said annular elements (2, 3) and the outer rim member (1) are joined to each other by a folded seam along their juxtaposed edges (10a, 11a; 8a, 9a).

6. A wheel according to claim 1, in which said annular elements (2, 3) are connected to the rim (1) by welding.

7. A wheel according to claim 2, in which the flanges (12, 13) of said annular elements (2, 3) are fixed together to the spacer ring (14) by projection welding.

8. A wheel according to claim 2, in which openings (16) are formed through said flanges (12, 13) of the annular elements (2, 3) and through the interposed spacer ring (14) for passage of fixing members for fixing the wheel (w) to a wheel hub.

* * * * *